A. B. HARRINGTON.
REVERSE GEAR MECHANISM.
APPLICATION FILED SEPT. 7, 1911.
1,029,610.
Patented June 18, 1912.
2 SHEETS—SHEET 1.
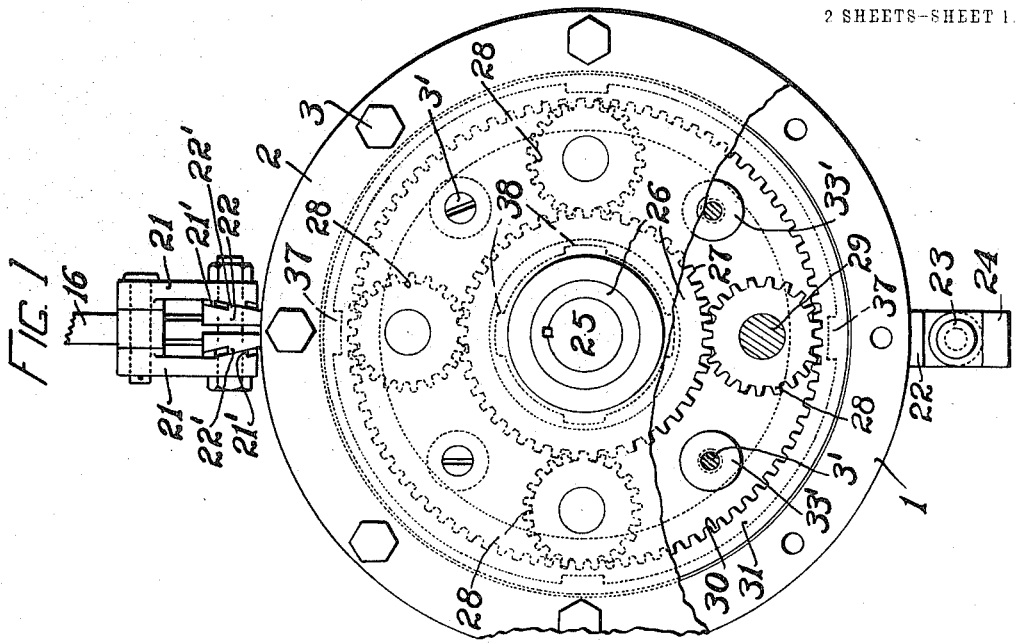
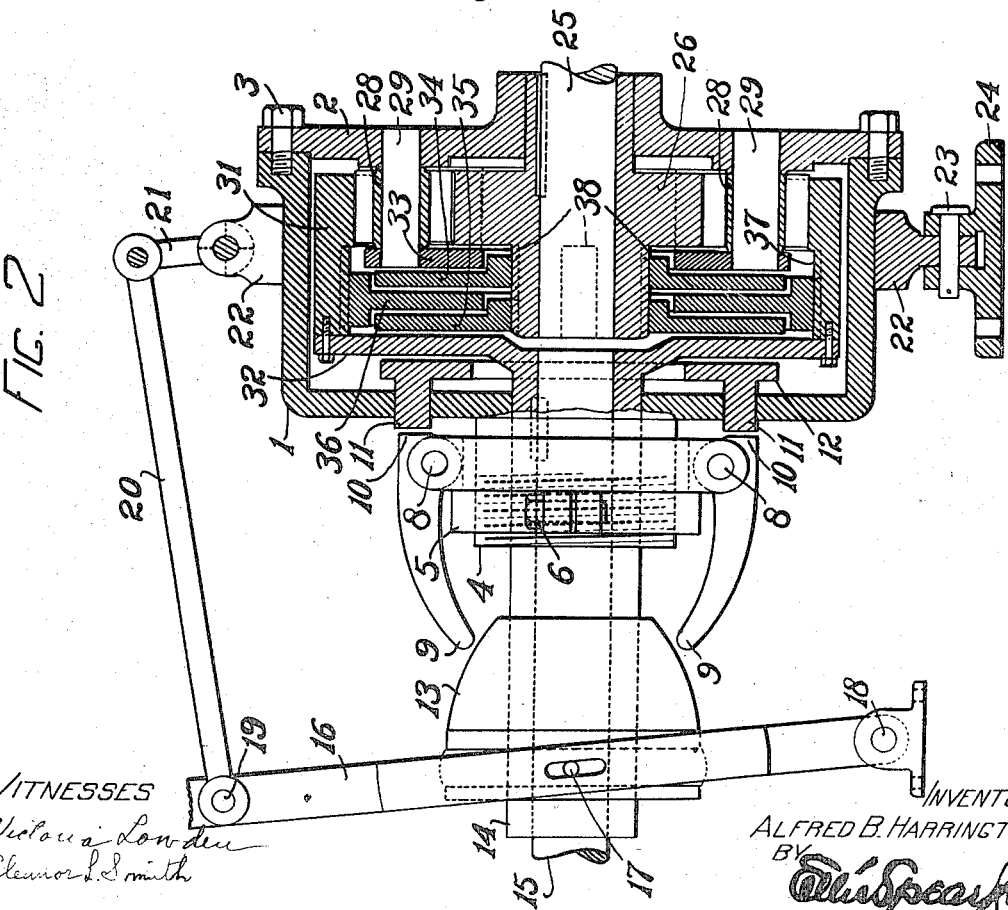
WITNESSES
Victoria Lowden
Eleanor L. Smith
INVENTOR
ALFRED B. HARRINGTON
BY
Ellis Spear Jr.
ATTY.

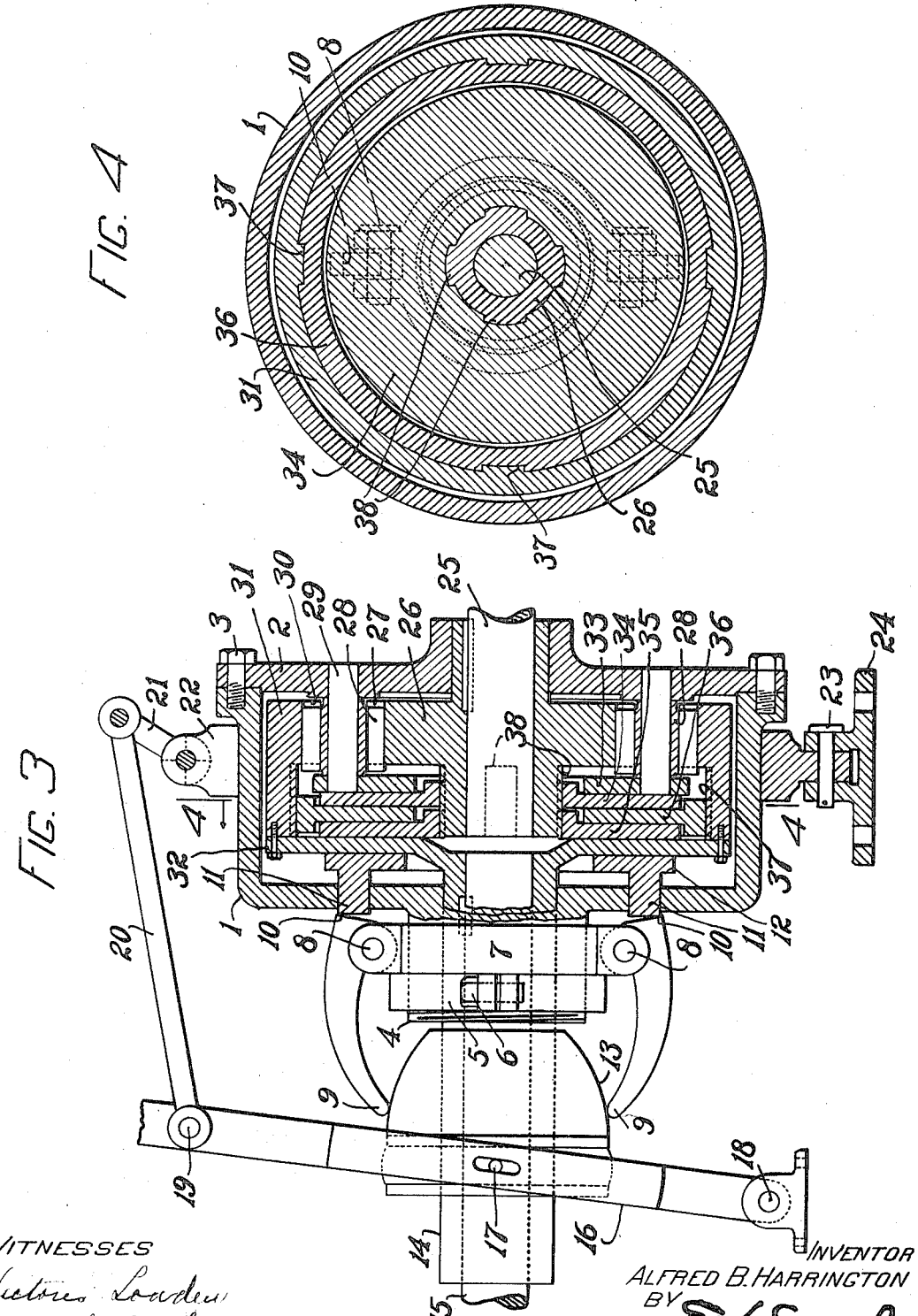

UNITED STATES PATENT OFFICE.

ALFRED B. HARRINGTON, OF DANVERS, MASSACHUSETTS.

REVERSE-GEAR MECHANISM.

1,029,610.     Specification of Letters Patent.     Patented June 18, 1912.

Application filed September 7, 1911. Serial No. 648,200.

*To all whom it may concern:*

Be it known that I, ALFRED B. HARRINGTON, a citizen of the United States, residing at 4 Oak street, Danvers, Massachusetts, have invented certain new and useful Improvements in Reverse-Gear Mechanism, of which the following is a specification.

This invention relates to reverse gears and particularly to a reversing mechanism for use with internal combustion engines or like motors which are constantly run in one direction.

In devices of this sort it is particularly desirable that the reversal be effected by means which shall avoid sudden and violent engagement of gearing and yet which when engaged shall afford a secure locking to prevent subsequent slipping. This desired result is particularly important in the reverse gear for motor boats in which there is usually desired only two connections, one, full speed ahead, and the other a reversal at slow speed.

By my invention I have been able to produce a reversing mechanism in which frictional engaging means are employed to secure a sufficiently yielding initial connection at high speed and yet afford a sufficiently positive ultimate drive.

The construction and operation of my invention will be more fully described in the specification which follows. In that specification and in the drawings which form a part of it, I have set forth particularly an embodiment which I have found well adapted to practical use in marine work.

Throughout specification and drawing like reference numerals are employed to indicate corresponding parts and in the drawings:

Figure 1 is an end view of my reverse gear mechanism with part of the casing broken away and with part of the internal gear indicated by dotted lines. Fig. 2 is a side view with the gear mechanism in central vertical section with the parts set for slow speed reverse. Fig. 3 is a similar view with the parts set for direct drive ahead and Fig. 4 is a section on the line 4—4 indicated in Fig. 3.

The reverse gear mechanism shown in the drawings comprises a casing 1 formed as a circular cup or shell open at one end. The cover 2 is fastened by bolts 3 to the open end of the shell and carries on its inner face a plurality of planetary pinions 28 mounted on studs 29. The ends of the studs 29 are supported in a ring 33 which is mounted on posts 33' to which the ring is attached by bolts 3'.

The casing 1 has a central opening on one side and the cover 2 a corresponding opening at its center. Through these openings respectively a propeller shaft 15 and the crank shaft 25 of the engine project. To the propeller shaft 15 is keyed a sleeve 14 having on its inner end a disk 32 to which is fastened an annular flange 31 having near its outer edge an internal rack 30 meshing with the pinions 28. Inside the internal rack 30 the flange 31 is provided with oppositely set pairs of ribs 37 which engage corresponding grooves in the rim of a disk 36.

Upon the rear face of the casing 1 is a hub 4 upon which is threaded a split collar 5 clamped by a bolt 6. A pair of arms 9 are pivoted at 8 to be forced apart by the cone 13 moved by the lever 16 to which the cone 13 is pinned as indicated at 17.

The split ring 22 surrounds the casing 1. This ring is supported on a base 24 which is bolted to the timbers upon which the engine is set or upon any other suitable support. The ring 22 is clamped by lever arms 21 on the inner faces of which are cam segments 21' which contact with corresponding cam segments 22' on the ears 22. The lever arms 21 are connected by a link 20 to the controlling lever 16 to which it is pivoted as indicated at 19.

The ends of the levers 9 are adapted to engage the studs 11 of the ring 12. The ring 12 is set within the casing 1 and the studs project through the rear wall of the casing 1.

It will be understood that the shaft 15 is held against longitudinal movement by a thrust block as is usual in propeller shafts. Upon the end of the engine shaft 25 is keyed a gear 26 meshing with the pinions 28. This gear 26 has a hub which finds suitable bearing in the cover 2 at one end and a second hub on the opposite side which has a plurality of ribs 38.

A pair of friction disks 34 and 35 surround the inner hub of the gear 26 and are held against rotation thereon by the ribs 38 which engage corresponding grooves in the disks. These disks are set on each side of the disk 36 which is held against rotation on the rim 31.

The operation of my device is as follows: With the parts set as shown in Fig. 2, the shaft 25 will transmit its power through the planetary gear 26, 28 and 30 to rotate the shaft 15 to which the gears are connected by the sleeve 14 with its plate and flange 32 and 31. In this position the ring 22 is clamped as shown in Fig. 1 so that the casing 1 cannot turn. This gives a reverse drive from the shaft 25 to the shaft 15 at slow speed. When it is desired to shift so as to go ahead at high speed, the lever 16 is thrown as indicated in Fig. 3. This rocks the lever 21 releasing the ring 22. At the same time the cone 13 forces apart the levers 9. The inner ends 10 of these levers bear against the studs 11 and the ring 12 is brought frictionally against the disk 32 on the sleeve 4. As the sleeve 4 is keyed to the shaft 15 it is held by the thrust block. The levers 9 pull the sleeve 5 which is mounted upon the hub 4 of the casing 1 thus drawing the entire casing 1 through the ring 22. This movement brings the ring 33 which is fastened to the cover 2 against the disk 34. This disk is in turn moved against disk 36 which contacts on its other side with the face of the disk 32. It will thus be seen that no less than eight friction surfaces are brought in contact with each other for the purpose of locking the engine shaft 35 to the propeller shaft 15 without throwing any additional strain upon the toothed pinions of the planetary gearing.

The locked position is shown in Fig. 3 and in this position the casing 1 is free to rotate within the split ring 22 so that the entire gear mechanism rotates as a unit locking the engine shaft to the propeller shaft.

Various modifications may obviously be made in the number of friction disks used and in the form and arrangement of the same and various other modifications of the structure in operation may be had, all without departing from the spirit of my invention, if within the limits of the appended claims.

What I therefore claim and desire to secure by Letters Patent is:

1. In a device of the class described a driving shaft and a driven shaft, gearing rotatable as a whole with one of said shafts for indirectly connecting said shafts, means for holding said gearing against rotation to secure indirect drive and means for directly coupling said shafts for direct drive.

2. In a device of the class described a driving shaft and a driven shaft a rotatable casing, an indirect gear train in said casing for indirectly connecting said shafts, means for holding said casing against rotation to secure indirect drive and means for directly coupling said shafts to said casing when free to rotate for direct drive.

3. A reverse gear mechanism comprising a rotatable casing, means for holding said casing against rotation, a gear in said casing, a driven shaft, a driving shaft, said casing being slidably mounted with reference thereto, a disk in said casing having an annular flange and a rack about the inner face thereof and connected to the driven shaft, intermediate gearing mounted on said casing and operatively intermeshing with said driving gear and said rack, a slidable friction member rotatably connected with said casing, slidable interposed friction members rotatably connected with said gear and means for moving said casing to engage said friction members.

4. A reverse gear mechanism comprising a rotatable casing, means for holding said casing against rotation, a gear in said casing, a driven shaft, a driving shaft, said casing being slidably mounted with reference thereto, a disk in said casing having a sleeve extending beyond said casing and an annular rack and connected to the driven shaft, intermediate gearing mounted on said casing and operatively intermeshing with said driving gear and said rack, a friction ring connected to said casing, interposed friction members rotatably connected with said gear and disk and held against rotation thereon respectively and means on said sleeve for drawing said casing toward said disk to compress the interposed friction members between said disk and said friction ring.

5. In a device of the class described a driving shaft and a driven shaft, a casing, reversing gearing in said casing and operatively connecting said shafts to turn said driven shaft at a slower speed than and in an opposite direction to said driving shaft, friction members on said driven shaft and on said casing, a friction member on said driving shaft and means to compress said friction members to lock said shafts directly together independent of said reversing gearing.

6. In a reverse gear mechanism a driving shaft, an indirect gear train operatively connecting said shafts, a casing, and frictional means for directly connecting said shafts to said casing independent of said gear train.

7. In a reverse gear mechanism a driving shaft and a driven shaft, a rotatable casing, an indirect gear train in said casing operatively connecting said shafts, frictional means for connecting said shafts to said rotatable casing for direct drive and means for holding said casing against rotation for indirect drive through said gear train.

In testimony whereof I affix my signature in presence of two witnesses.

ALFRED B. HARRINGTON.

Witnesses:
VICTORIA LOWDEN,
EDWARD N. GODING.